(12) United States Patent
Choi

(10) Patent No.: US 11,973,379 B2
(45) Date of Patent: Apr. 30, 2024

(54) MOTOR

(71) Applicant: LG INNOTEK CO., LTD., Seoul (KR)

(72) Inventor: Dae Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 451 days.

(21) Appl. No.: 17/293,126

(22) PCT Filed: Nov. 12, 2019

(86) PCT No.: PCT/KR2019/015300
§ 371 (c)(1),
(2) Date: May 12, 2021

(87) PCT Pub. No.: WO2020/116805
PCT Pub. Date: Jun. 11, 2020

(65) Prior Publication Data
US 2022/0006363 A1    Jan. 6, 2022

(30) Foreign Application Priority Data

Dec. 4, 2018 (KR) .................. 10-2018-0154428

(51) Int. Cl.
*H02K 11/215* (2016.01)
*H02K 1/278* (2022.01)
(Continued)

(52) U.S. Cl.
CPC ......... *H02K 11/215* (2016.01); *H02K 1/278* (2013.01); *H02K 1/28* (2013.01); *H02K 5/04* (2013.01);
(Continued)

(58) Field of Classification Search
CPC ........ H02K 11/215; H02K 1/278; H02K 1/28; H02K 5/04; H02K 2211/03;
(Continued)

(56) References Cited

U.S. PATENT DOCUMENTS 7,589,443 B2   9/2009   Kataoka et al.
8,040,006 B2   10/2011  Murakami
(Continued)

FOREIGN PATENT DOCUMENTS

DE   10-2004-059181   6/2006
DE   10-2011-089667   6/2013
(Continued)

OTHER PUBLICATIONS

JP 2017015658 A (Year: 2017).*
(Continued)

*Primary Examiner* — Ahmed Elnakib
(74) *Attorney, Agent, or Firm* — KED & ASSOCIATES, LLP

(57) ABSTRACT

An embodiment relates to a motor which comprises: a housing; a cover disposed to cover the housing; a stator disposed in the housing; a rotor disposed inside the stator; a shaft disposed in the center of the rotor; a sensing magnet disposed at the end of the shaft; and a circuit board including a sensor for sensing the sensing magnet, wherein the sensor is disposed inside a hole formed through the cover. Therefore, in the motor, a hole is formed through the cover disposed to cover an opening of the housing and a sensor is disposed inside the hole, so that a size of an axis direction of the motor can be reduced.

19 Claims, 9 Drawing Sheets

(51) Int. Cl.
*H02K 1/28* (2006.01)
*H02K 5/04* (2006.01)

(52) U.S. Cl.
CPC ...... *H02K 2211/03* (2013.01); *H02K 2213/03* (2013.01)

(58) Field of Classification Search
CPC ...... H02K 2213/03; H02K 11/33; H02K 5/10; H02K 11/21; H02K 1/276; H02K 21/14
USPC ........................................................ 310/68 R
See application file for complete search history.

(56) References Cited

U.S. PATENT DOCUMENTS

| | | | |
|---|---|---|---|
| 2009/0230801 | A1 | 9/2009 | Yamada |
| 2018/0283525 | A1 | 10/2018 | Uematsu et al. |
| 2020/0079420 | A1* | 3/2020 | Takada ................. B62D 5/0403 |

FOREIGN PATENT DOCUMENTS

| | | | |
|---|---|---|---|
| JP | S61-116955 | | 6/1986 |
| JP | H06-351213 | | 12/1994 |
| JP | 5751785 | | 7/2015 |
| JP | 2015-154673 | | 8/2015 |
| JP | 2016-082815 | | 5/2016 |
| JP | 2017-015658 | | 1/2017 |
| JP | WO 2018/123879 | | 7/2018 |
| JP | WO 2018123879 | * | 7/2018 |
| JP | 2018-126043 | | 8/2018 |
| JP | 6373532 | | 8/2018 |
| KR | 10-2008-0015846 | | 2/2008 |
| KR | 10-2017-0088061 | | 8/2017 |

OTHER PUBLICATIONS

European Search Report dated Aug. 11, 2022 issued in Application No. 19893244.4.

International Search Report dated Feb. 20, 2020 issued in Application No. PCT/KR2019/015300.

Japanese Office Action dated Aug. 22, 2023 issued in Application No. 2021-530907.

* cited by examiner

[FIG. 1]
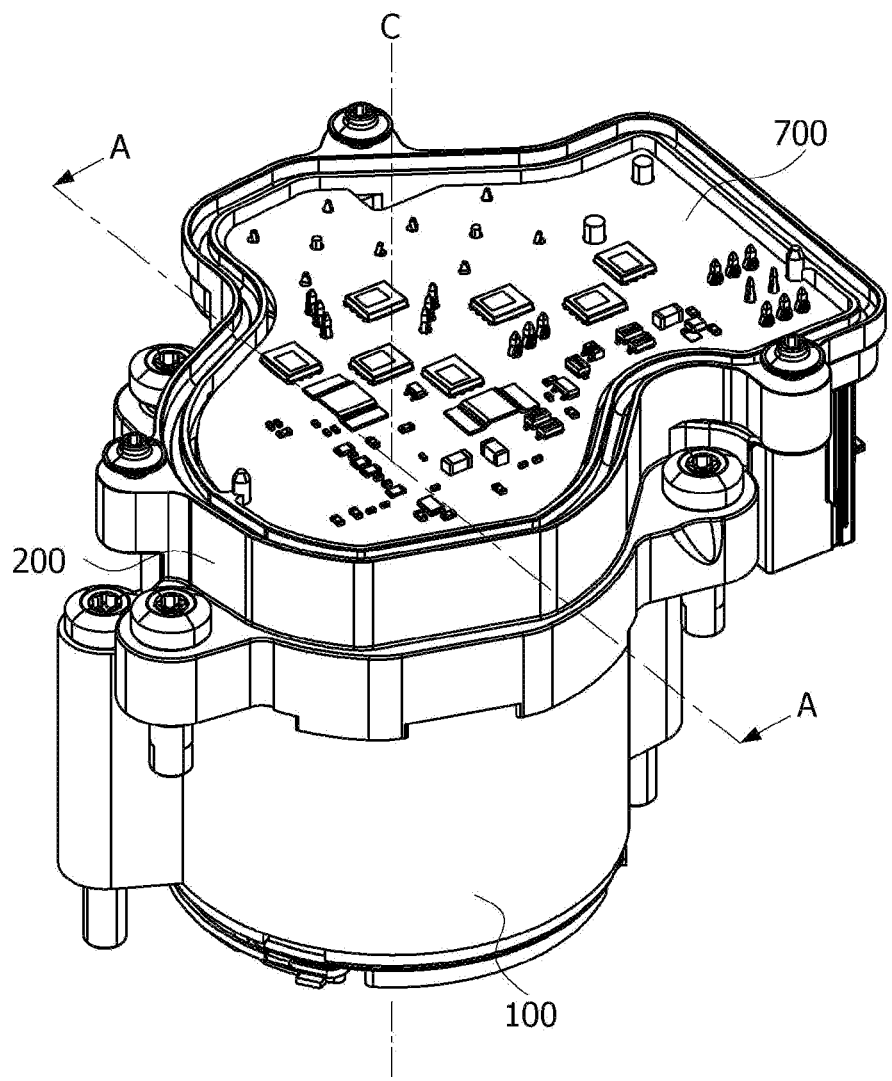

[FIG. 2]
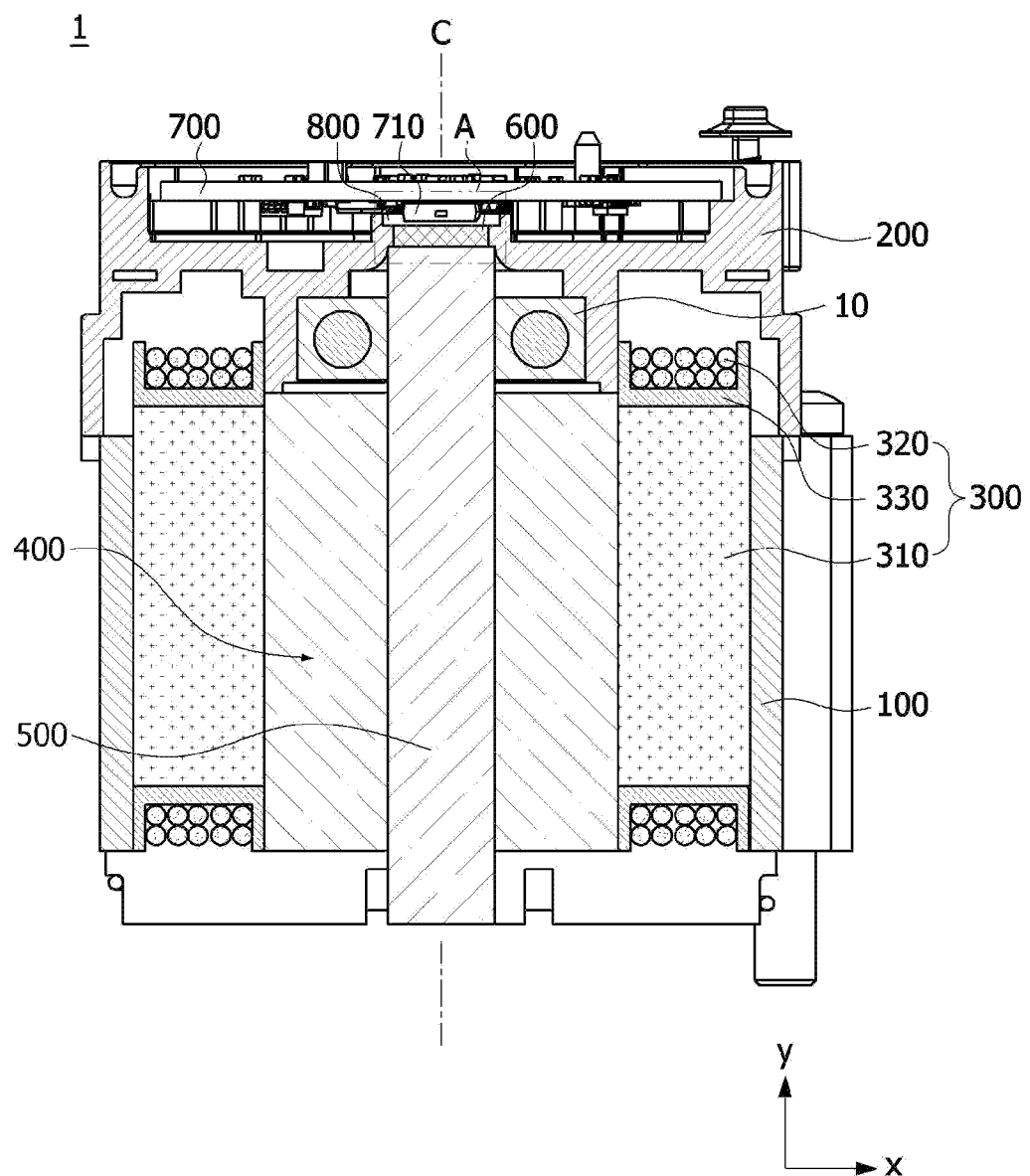

[FIG. 3]
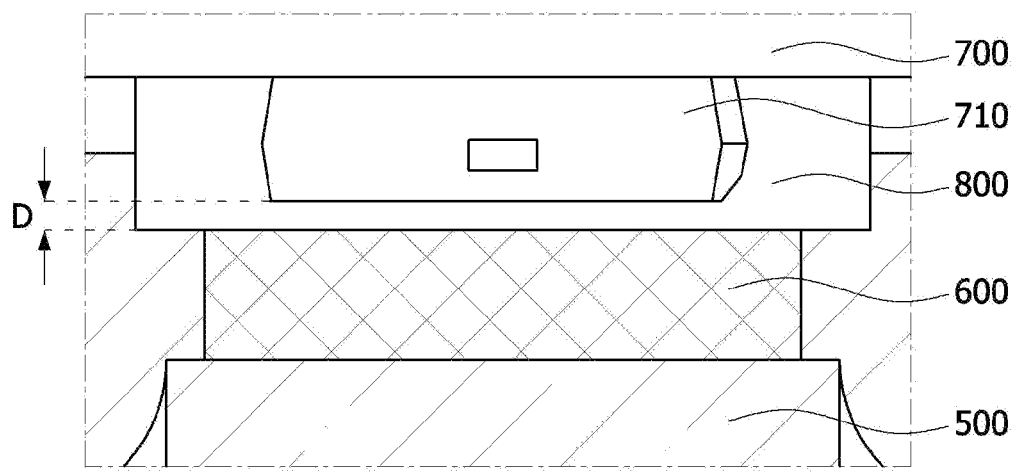
[FIG. 4]
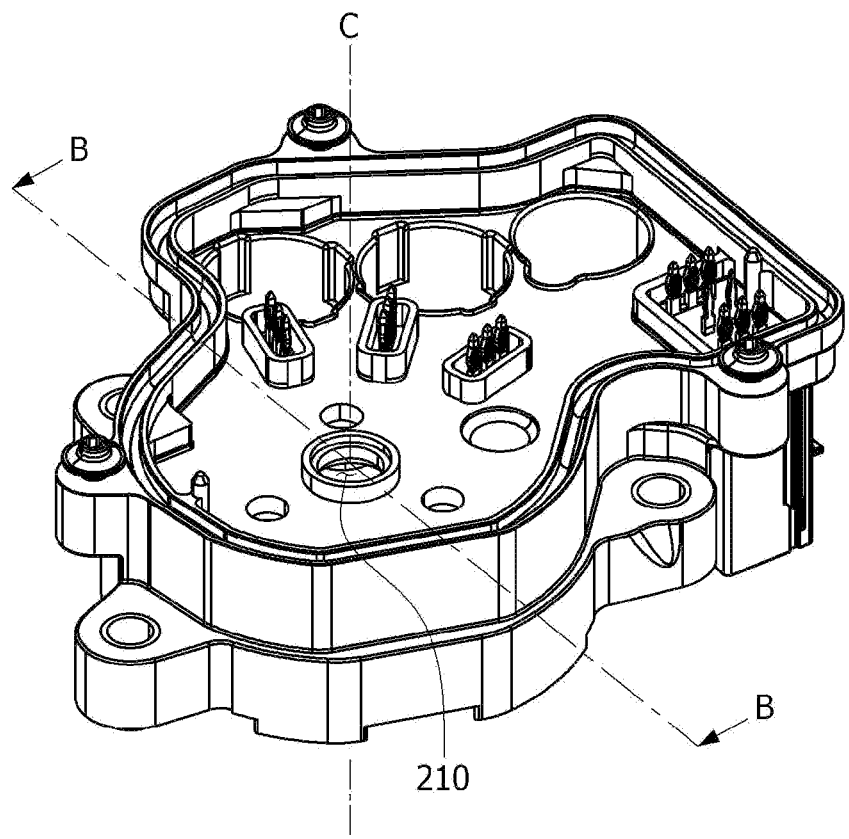

[FIG. 5]
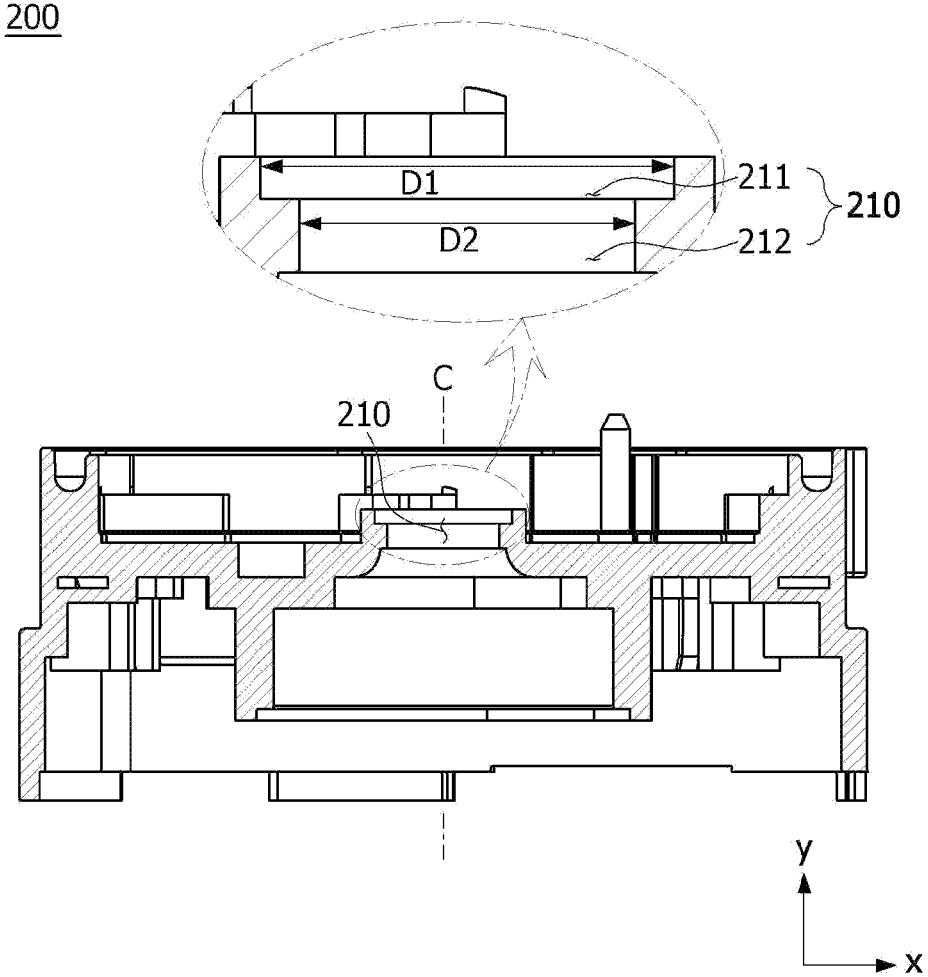

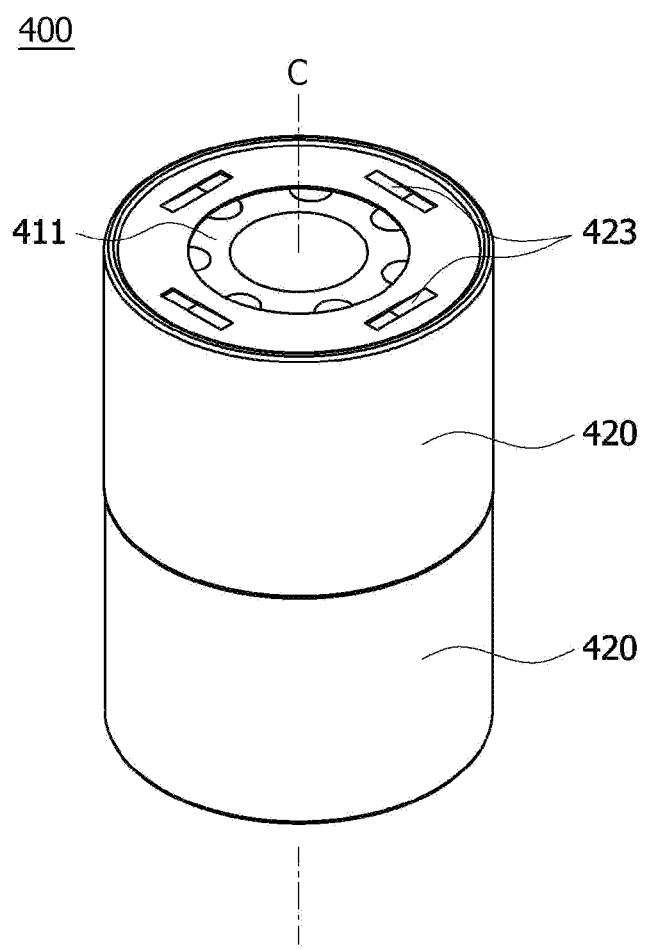
[FIG. 6]

[FIG. 7]
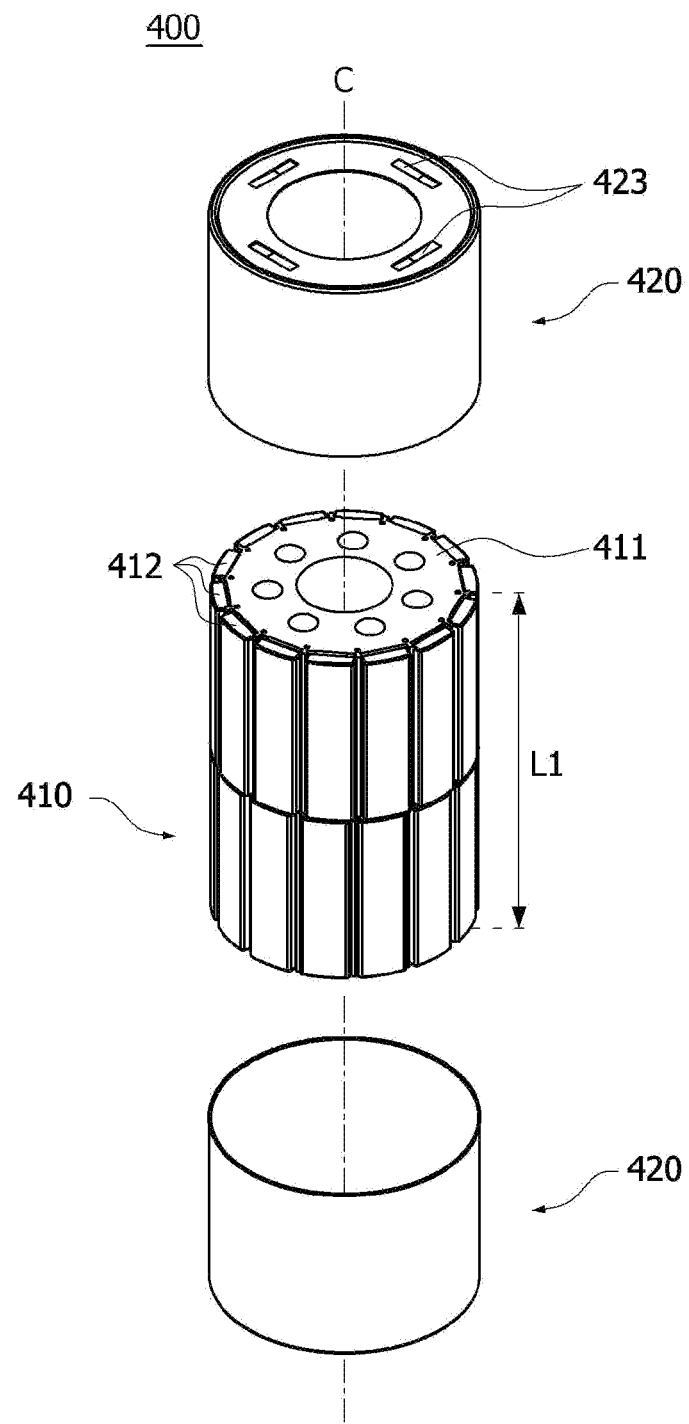

[FIG. 8]
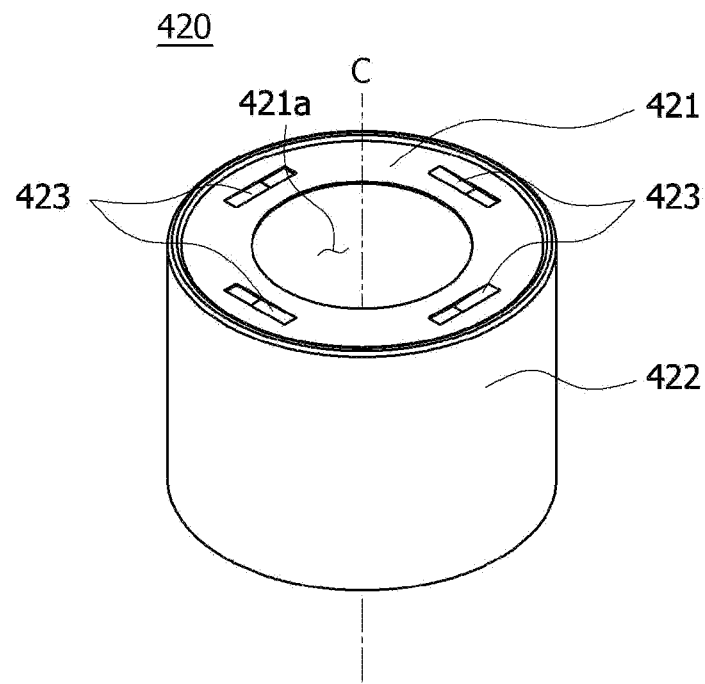
[FIG. 9]
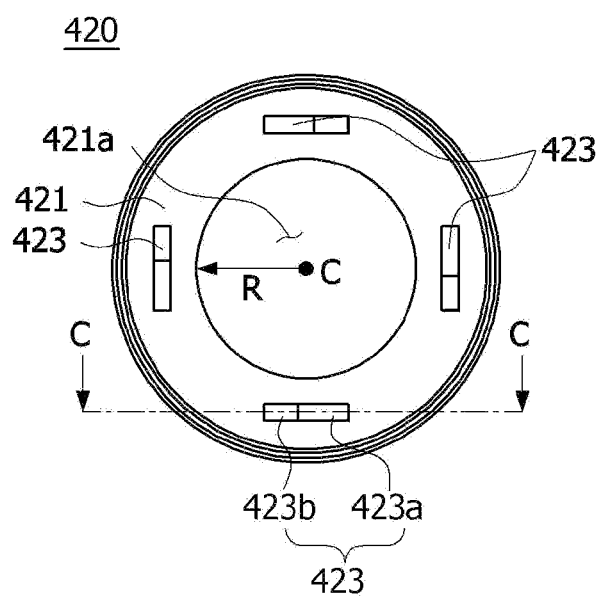

[FIG. 10]
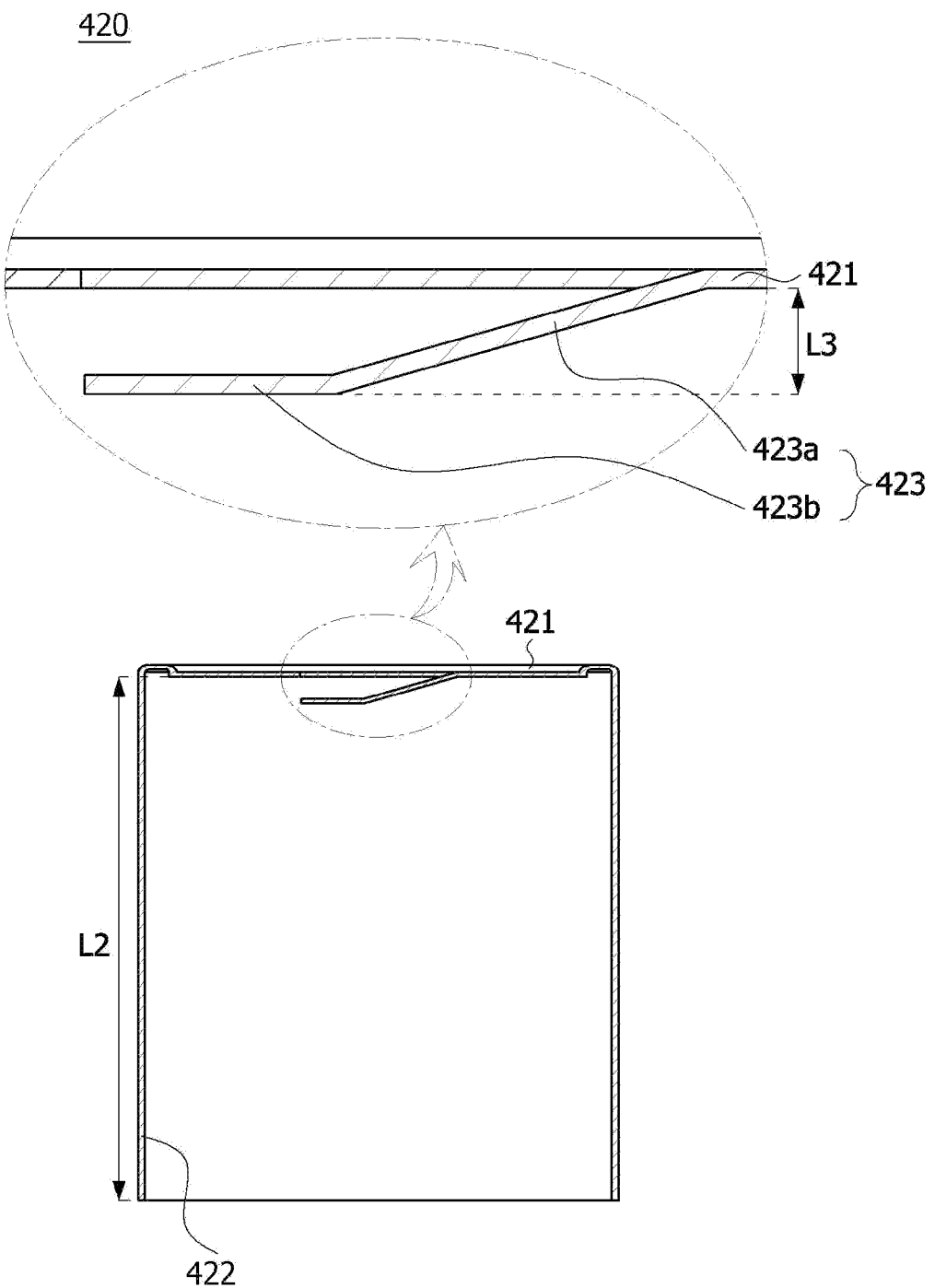

[FIG. 11]
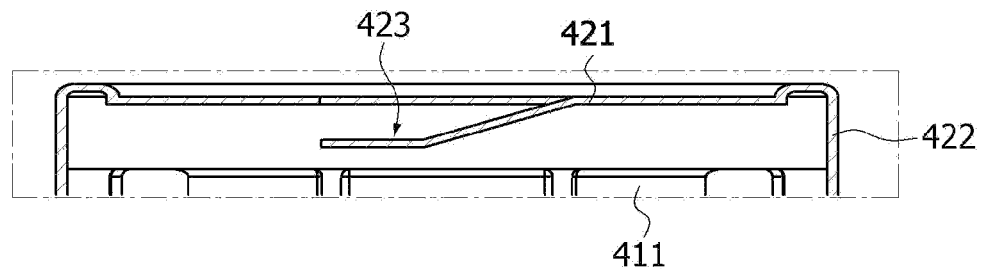
[FIG. 12]
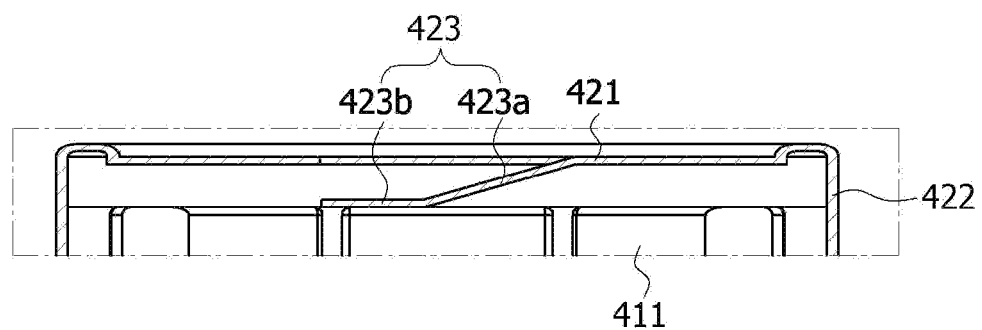
[FIG. 13]
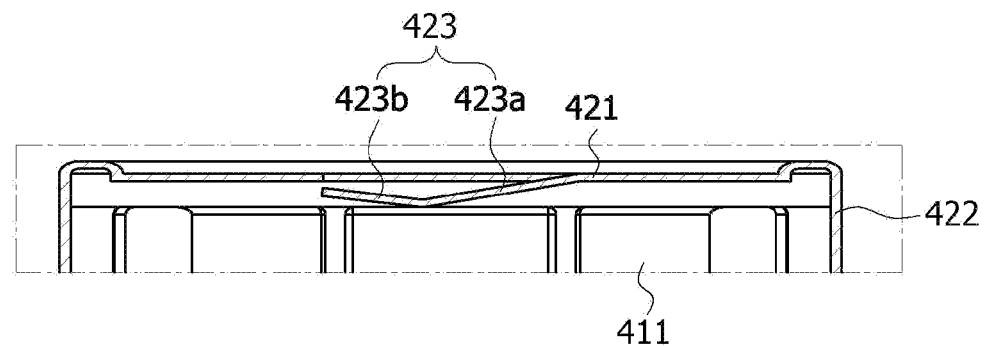

MOTOR

CROSS-REFERENCE TO RELATED PATENT APPLICATIONS

This application is a U.S. National Stage Application under 35 U.S.C. § 371 of PCT Application No. PCT/KR2019/015300, filed Nov. 12, 2019, which claims priority to Korean Patent Application No. 10-2018-0154428, filed Dec. 4, 2018, whose entire disclosures are hereby incorporated by reference.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like. Particularly, the motor may be used in a device for securing steering stability of a vehicle. For example, the motor may be used as a vehicle motor in an electronic power steering (EPS) system or the like.

The motor may include a housing, a shaft, a stator disposed in the housing, a rotor installed on an outer circumferential surface of the shaft, and the like. In this case, an electrical interaction may be induced between the stator and the rotor so that the rotor may rotate. In addition, the shaft is also rotated due to the rotation of the rotor.

The motor may detect a position of the rotor to control the rotor. Accordingly, the motor may further include a sensing magnet and a circuit board on which a sensor configured to detect the sensing magnet is disposed in order to detect the position of the rotor.

In this case, a distance between the sensing magnet and the sensor is very important to satisfy sensing performance. However, it is difficult to maintain the distance due to size limitation demanded by users of the motor in a shaft direction (longitudinal direction of the shaft).

Meanwhile, a plurality of magnets are installed on the rotor, and the rotor may be formed as a surface permanent magnet (SPM) type rotor in which magnets are attached to a surface of a rotor core.

Cans may be used for the rotor to prevent separation and rust generation of the magnets.

The cans may be provided as two members so that the cans may be inserted from an upper side and a lower side to completely cover the magnets in a state in which the magnets are attached to the rotor core.

However, due to an assembly tolerance of the cans, a certain gap may be formed between the two members, and a problem may occur that the magnets are exposed and rust is generated due to the gap.

However, although the gap can be minimized in a case in which a thickness of the member is as thin as 0.15 mm, it is difficult to secure rigidity when the motor is driven at a high speed.

In addition, in a case in which the thickness of the member is formed to be as thick as 0.3 mm, since the rigidity of the can is increased, assemblability thereof can be lowered. In addition, when the cans are press-fitted so that end portions come into contract with each other, there is a problem in that the magnets are broken due to overload applied to the cans.

Accordingly, there is a need for a can capable of preventing generation of the gap and also capable of securing the rigidity.

Technical Problem

The present invention is directed to providing a motor in which a hole is formed in a cover disposed to cover an opening of a housing and a sensor is disposed in the hole to secure a predetermined distance between the sensor and a sensing magnet so that the sensing performance is secured and a size in a shaft direction is reduced.

The present invention is directed to providing a motor in which an elastic structure capable of elastically supporting a rotor core is implemented on caps formed to have a predetermined thickness to prevent generation of a gap between the caps and secure rigidity regardless of an assembly tolerance.

Objectives to be solved by the present invention are not limited to the above-described objectives, and other objectives which are not described above will be clearly understood by those skilled in the art from the following specification.

Technical Solution

One aspect of the present invention provides a motor including a housing, a cover disposed to cover the housing, a stator disposed in the housing, a rotor disposed inside the stator, a shaft disposed in a central portion of the rotor, a sensing magnet disposed on an end portion of the shaft, and a circuit board including a sensor configured to detect the sensing magnet, wherein the sensor is disposed in a hole formed in the cover.

The motor may further include a sealing member disposed to cover the sensor.

The hole may include a first region and a second region which have different inner diameters, the inner diameter of the first region may be greater than the inner diameter of the second region, and the sealing member may be disposed around the first region.

In a state in which the circuit board is coupled to the cover, the sealing member may be applied on the sensor through the hole and cured.

The sensing magnet may be disposed to face the sensor with the sealing member disposed between the sensing magnet and the sensor.

One surface of the sensing magnet may be in contact with the sealing member.

The rotor may include a rotor unit including a rotor core and a plurality of magnets disposed on an outer circumferential surface of the rotor core to be spaced apart from each other, and a pair of cans which cover an upper portion and a lower portion of the rotor unit, wherein the cans may include plate parts having a plate shape, sidewall parts protruding from outer circumferential surfaces of the plate parts in a shaft direction, and at least two protruding parts protruding from each of the plate parts, and the protruding part may protrude toward the rotor core.

The protruding part may be formed in the can by cutting and pressing one region of the plate part.

The plate part may include a hole formed in a central portion, and a radius from a center (C) of the rotor to an inner circumferential surface of the plate part may be smaller than a distance to the outer circumferential surface of the rotor core.

The protruding part may include a connecting part which is bent and extends from the plate part and a support part extending from the connecting part, and the support part may be in contact with one side of the rotor core.

As the support part is pressed by the rotor core, one region at which the support part meets the connecting part may be in line contact with the rotor core.

The sum of lengths of the sidewall parts of the pair of cans in the shaft direction may be greater than a length of the rotor core in the shaft direction.

The at least two protruding parts may be disposed to be rotationally symmetrical with respect to a center.

A thickness of the can may be in a range of 3.0 to 3.5 mm.

Advantageous Effects

According to embodiments, in a motor having an above-described configuration, a hole is formed in a cover disposed to cover an opening of a housing, and a sensor is disposed in the hole, and thus a size of the motor in a shaft direction can be reduced.

In this case, a sealing force can be improved using a sealing member disposed to cover a sensor in the hole.

In addition, a sensing magnet is disposed to be in contact with the sealing member to secure a distance between the sensor and the sensing magnet so that constant quality for sensing performance can be maintained.

Meanwhile, in the motor, an elastic structure capable of elastically supporting a rotor core is implemented in caps formed to have a predetermined thickness, generation of a gap can be prevented between the caps and rigidity can also be secured regardless of an assembly tolerance.

Various useful advantages and effects of the embodiments are not limited to the above-described contents and will be more easily understood from descriptions of the specific embodiments.

DESCRIPTION OF DRAWINGS

FIG. 1 is a perspective view illustrating a motor according to an embodiment.

FIG. 2 is a cross-sectional view illustrating the motor according to the embodiment.

FIG. 3 is an enlarged view illustrating a region A of FIG. 2.

FIG. 4 is a perspective view illustrating a cover of the motor according to the embodiment.

FIG. 5 is a cross-sectional view illustrating the cover of the motor according to the embodiment.

FIG. 6 is a perspective view illustrating a rotor of the motor according to the embodiment.

FIG. 7 is an exploded perspective view illustrating the rotor of the motor according to the embodiment.

FIG. 8 is a perspective view illustrating a can of the motor according to the embodiment.

FIG. 9 is a plan view illustrating the can of the motor according to the embodiment.

FIG. 10 is a cross-sectional view taken along line C-C of FIG. 9.

FIG. 11 is a view illustrating one example of an arrangement relationship between a rotor core and a protruding part of the can in the rotor of the motor according to the embodiment.

FIG. 12 is a view illustrating another example of an arrangement relationship between the rotor core and the protruding part of the can in the rotor of the motor according to the embodiment.

FIG. 13 is a view illustrating still another example of an arrangement relationship between the rotor core and the protruding part of the can in the rotor of the motor according to the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having meanings customary to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

FIG. 1 is a perspective view illustrating a motor according to an embodiment, FIG. 2 is a cross-sectional view illustrating the motor according to the embodiment, and FIG. 3 is an enlarged view illustrating a region A of FIG. 2. In this case, FIG. 2 is the cross-sectional view taken along line A-A of FIG. 1. In addition, in FIG. 2, a y direction is referred to as a shaft direction, and an x direction is referred to as a radial direction.

Referring to FIGS. 1 to 3, a motor 1 according to the embodiment may include a housing 100 in which an opening is formed at one side, a cover 200 disposed on the housing 100, a stator 300 disposed in the housing 100, a rotor 400 disposed inside the stator 300, a shaft 500 configured to rotate along with the rotor 400, a sensing magnet 600 disposed at an end portion of one side of the shaft 500, and a circuit board 700 disposed above the cover 200. In addition, the motor 1 may further include a sealing member 800 disposed to cover a sensor 710 disposed on the circuit board 700. In this case, the sensor 710 disposed on the circuit board 700 of the motor 1 may detect the sensing magnet 600 to detect rotation of the shaft 500. In this case, the term "inside" may be referred to as a direction toward a center C in the radial direction, and the term "outside" may be referred to as a direction opposite to the term "inside."

Meanwhile, the motor 1 may further include a busbar (not shown) disposed on the stator 300 or a busbar terminal disposed on an insulator 330 of the stator 300. In addition, the busbar or the busbar terminal may be electrically connected to a coil 320 of the stator 300.

The housing 100 and the cover 200 may form an exterior of the motor 1. In addition, the housing 100 may be coupled to the cover 200 to form an accommodation space. Accordingly, as illustrated in FIG. 2, the rotor 400, the stator 300, the shaft 500, and the like may be disposed in the accommodation space. In this case, the shaft 500 may be rotatably disposed in the accommodation space. Accordingly, the motor 1 may further include a bearing 10 disposed on the shaft 500.

The housing 100 may be formed in a cylindrical shape. In addition, the stator 300, the rotor 400, the shaft 500, and the like may be accommodated in the housing 100. In this case, the shape or material of the housing 100 may be variously changed. For example, the housing 100 may be formed of a metal material which firmly withstands even at high temperature.

The cover 200 may be disposed on an open surface of the housing 100, that is, an upper portion of the housing 100, to cover the opening of the housing 100.

FIG. 4 is a perspective view illustrating the cover of the motor according to the embodiment, and FIG. 5 is a cross-sectional view illustrating the cover of the motor according to the embodiment. In this case, FIG. 5 is the cross-sectional view taken along line B-B of FIG. 4.

Referring to FIGS. 4 and 5, the cover 200 may include a hole 210.

The hole 210 may be formed to pass through the cover 200 in the shaft direction. In this case, a center C of the hole 210 may be disposed to be virtually collinear with a center C of the shaft 500.

The hole 210 may include a first region 211 and a second region 212 having different inner diameters. As illustrated in FIG. 5, an inner diameter D1 of the first region 211 is greater than an inner diameter D2 of the second region 212. In addition, the first region 211 may be disposed above the second region 212 in consideration of the sealing member 800.

The stator 300 may be supported by an inner circumferential surface of the housing 100. In addition, the stator 300 may be disposed outside the rotor 400. That is, the rotor 400 may be disposed inside the stator 300.

Referring to FIGS. 2, the stator 300 may include a stator core 310, the coil 320 wound around the stator core 310, and an insulator 330 disposed between the stator core 310 and the coil 320.

The coil 320 configured to generate a rotating magnetic field may be wound around the stator core 310. In this case, the stator core 310 may be formed of one core or formed of a plurality of split cores coupled to each other.

In addition, the stator core 310 may be formed in a form in which a plurality of thin steel plates are stacked but is not necessarily limited thereto. For example, the stator core 310 may be formed as one single component.

The stator core 310 may include a yoke (not shown) having a cylindrical shape and a plurality of teeth (not shown) protruding in the radial direction from the yoke. In addition, the coil 320 may be wound around the tooth.

The insulator 330 insulates the stator core 310 from the coil 320. Accordingly, the insulator 330 may be disposed between the stator core 310 and the coil 320.

Accordingly, the coil 320 may be wound around the tooth 312 of the stator core 310 on which the insulator 330 is disposed.

The rotor 400 may be disposed inside the stator 300. In addition, the rotor 400 may include a hole formed in a central portion so that the shaft 500 is inserted into the hole. Accordingly, the shaft 500 may be coupled to the hole of the rotor 400. In this case, the rotor 400 may be rotatably disposed inside the stator 300.

FIG. 6 is a perspective view illustrating the rotor of the motor according to the embodiment, and FIG. 7 is an exploded perspective view illustrating the rotor of the motor according to the embodiment.

Referring to FIGS. 6 and 7, the rotor 400 may include a rotor unit 410 including a rotor core 411 and a plurality of magnets 412 disposed on outer circumferential surface of the rotor core 411 to be spaced apart from each other and a pair of cans 420 for covering an upper portion and a lower portion of the rotor unit. In this case, end portions the pair of cans 420 may be formed to be in contact with each other to prevent foreign materials from being introduced into the rotor unit 410.

In this case, the cans 420 may be formed to have the same shape. Accordingly, since the cans 420 disposed on the upper portion and the lower portion of the rotor unit 410 can be shared, a production cost can be reduced.

Accordingly, the cans 420 may be disposed to surround the rotor unit 410 to prevent separation of the magnets 412 of the rotor unit 410 and generation of rust thereon.

Referring to FIG. 7, the rotor unit 410 may include the rotor core 411 and the plurality of magnets 412 disposed on the outer circumferential surface of the rotor core 411 to be spaced apart from each other at preset intervals. In this case, the magnets 412 may be referred to as rotor magnets or drive magnets.

The rotor core 411 may be formed in a form, in which a plurality of circular thin steel plates are stacked, or in a single cylindrical form. Accordingly, the rotor core 411 may be formed to have a predetermined length L1 in the shaft direction. In this case, the length of the rotor core 411 may be referred to as a first length.

In addition, a hole to which the shaft 500 is coupled may be formed at a center C of the rotor core 411.

The magnets 412 may be disposed on the outer circumferential surface of the rotor core 411 to be spaced apart from each other at the preset intervals. In this case, the magnets 412 may be attached to the outer circumferential surface of the rotor core 411 using an adhesive member such as glue.

As illustrated in FIG. 7, two magnets 412 may be vertically disposed to form a skew. In addition, the plurality of magnets 412 in which the skew is formed may be disposed on the outer circumferential surface of the rotor core 411 in a circumferential direction. In this case, the term "skew" may denote that the magnet 412 disposed on an upper portion and the magnet 412 disposed on the lower portion are misaligned in the shaft direction.

The cans 420 may be formed to have a cup shape in which a hole is formed in a central portion and may be disposed to cover the upper portion and the lower portion of the rotor unit 410. In this case, the can 420 may be referred to as a cap.

The can 420 may protect the rotor unit 410 from external shocks and physical and chemical stimuli while preventing foreign materials from being introduced into the rotor unit 410.

In this case, a thickness of the can 420 may be in the range of 3.0 to 3.5 mm. For example, in a case in which the thickness of the can 420 is as thin as 0.15 mm, it is difficult to secure rigidity when the motor 1 is driven at a high speed. Accordingly, in the motor 1, the can 420 may be formed to have a thickness of 3.0 to 3.5 mm to secure the rigidity. In this case, in a case in which the rotor core 411 is formed in a form in which a plurality of plates are stacked, a thickness of the plate may be 0.5 mm.

In addition, in the motor 1, protruding parts 423 may be formed on the cans 420 to elastically support the rotor core 411 to overcome an assembly limitation related to the length L1 of the rotor core 411 in the shaft direction so that the end portions of the pair of cans 420 may be in contact with each other. Accordingly, in the motor 1, through the protruding parts 423 formed on the cans 420, assemblability of the rotor 400 and versatility of the can 420 can be improved.

FIG. 8 is a perspective view illustrating the can of the motor according to the embodiment, FIG. 9 is a plan view illustrating the can of the motor according to the embodiment, and FIG. 10 is a cross-sectional view taken along line C-C of FIG. 9.

Referring to FIGS. 8 to 10, the can 420 may include a plate part 421 disposed above or under the rotor unit 410, a sidewall part 422 protruding from an outer circumferential surface of the plate part 421 in the shaft direction, and the protruding parts 423 formed on the plate part 421 to protrude toward the rotor unit 410. In this case, the plate part 421, the sidewall part 422, and the protruding parts 423 may be integrally formed.

The plate part 421 may be formed as a circular plate in which a hole 421a is formed in a central portion. In this case, the hole 421a may be formed in a circular shape having a predetermined radius R. Accordingly, the radius R from a center C of the rotor 400 or a center C of the plate part 421 to an inner circumferential surface of the plate part 421 may be smaller than a distance to the outer circumferential surface of the rotor core 411. Accordingly, the protruding parts 423 formed on the plate part 421 to protrude toward the rotor unit 410 may be in contact with an upper surface or lower surface of the rotor core 411.

As illustrated in FIG. 7, the plate part 421 may be formed in a ring shape when viewed from above.

The plate part 421 may be disposed to cover a part of the rotor core 411 and the magnets 412. For example, from the center C of the rotor 400, a distance to the inner circumferential surface of the plate part 421 is smaller than the distance to the outer circumferential surface of the rotor core 411.

The sidewall part 422 may be formed on the outer circumferential surface of the plate part 421 to protrude in the shaft direction.

The sidewall part 422 may be formed to have a predetermined length L2 in the shaft direction. In this case, the length L2 of the sidewall part 422 in the shaft direction may be based on a lower surface of the plate part 421. In this case, the length L2 of the sidewall part 422 in the shaft direction may be referred to as a second length. In addition, the length L2 of the sidewall part 422 in the shaft direction may be greater than half of the length L1 of the rotor core 411 in the shaft direction.

For example, since the sum of the lengths L2 of the sidewall parts 422 of the pair of cans 420 in the shaft direction may be greater than the length L1 of the rotor core 411 in the shaft direction, the end portions of the pair of cans 420 may be disposed to be in contact with each other.

The sidewall part 422 may be formed in a cylindrical shape.

The sidewall part 422 may be disposed outside the magnets 412. Accordingly, the sidewall part 422 prevents the magnets 412 from moving in the radial direction. That is, the sidewall part 422 may support outer side surfaces of the magnets 412 in corresponding to a centrifugal force due to rotation of the rotor 400.

At least two protruding parts 423 may be formed on the plate part 421. In addition, the plurality of protruding parts 423 may be disposed to be spaced apart from each other at predetermined intervals in a circumferential direction of the plate part 421. For example, three protruding parts 423 may be disposed to be spaced apart from each other at intervals of 120° about the center C. Accordingly, when the can 420 is disposed on the rotor unit 410, the can 420 can be prevented from being inclined in the shaft direction due to the protruding parts 423.

Meanwhile, in a case in which an even number of the protruding parts 423 are disposed, the protruding parts 423 may be symmetrically disposed with respect to the center C. In addition, at least of a pair of protruding parts 423 may be disposed to be rotationally symmetrical with respect to the center C. As illustrated in FIG. 9, four protruding parts 423 may be disposed to be rotationally symmetrical with respect to the center C at intervals of 90°.

The protruding parts 423 may be formed on one surface of the plate part 421 to protrude toward the rotor core 411. In this case, the protruding part 423 may be formed by cutting and pressing one region of the plate part 421. Accordingly, when the can 420 is fitted onto the rotor unit 410, a part of the protruding part 423 may be in contact with the rotor core 411 to elastically support the rotor core 411.

Referring to FIG. 10, the protruding part 423 may include a connecting part 423a that is bent and extends from the plate part 421 and a support part 423b extending from the connecting part 423a. In this case, the support part 423b may be disposed to be spaced apart from the plate part 421 by a predetermined distance.

Accordingly, since the connecting part 423a is disposed to be inclined with respect to one surface of the plate part 421, and the support part 423b extends from the connecting part 423a to be spaced apart from the plate part 421 by the predetermined distance, the protruding part 423 may be implemented to have an elastic structure supporting the rotor core 411. In this case, the protruding length L3 of the protruding part 423 in the shaft direction may be based on the lower surface of the plate part 421.

When the rotor unit 410 is coupled to the can 420, as illustrated in FIG. 8, the support part 423b may be in contact with one side of the rotor core 411. For example, in the case of the can 420 disposed on the upper portion of the rotor unit 410, the support part 423b of the can 420 may be in contact with the upper surface of the rotor core 411.

Accordingly, even when an assembly tolerance occurs due to coupling of the rotor unit 410 and the can 420 in the shaft direction, the assembly tolerance may be compensated by as much as the protruding length L3 of the protruding part 423 from the plate part 421 in the shaft direction.

Accordingly, since the length L2 of the sidewall part 422 in the shaft direction is greater than half of the length L1 of the rotor core 411 in the shaft direction, the end portions of the pair of cans 420 may be in contact with each other. In this case, even in a case in which the half of the length L1 of the rotor core 411 in the shaft direction is greater than a length in which the protruding length L3 of the protruding part 423 is subtracted from the length L2 of the sidewall part 422 in the shaft direction based on the plate part 421, since compensation may be performed by as much as the protruding length L3 of the protruding part 423, the upper surface or the lower surface of the rotor core 411 may be disposed to press the protruding part 423. Accordingly, the end portions of the pair of cans 420 may be in contact with each other. In addition, the end portions of the cans 420 which are in contact with each other may be fixed by an adhesive member or through welding.

FIG. 11 is a view illustrating one example of an arrangement relationship between the rotor core and the protruding part of the can in the rotor of the motor according to the embodiment.

Referring to FIG. 11, in a case in which half of the length L1 of the rotor core 411 in the shaft direction is smaller than a length in which the protruding length L3 of the protruding part 423 is subtracted from the length L2 of the sidewall part 422 in the shaft direction, the protruding part 423 is disposed to be spaced apart from the rotor core 411 in the shaft direction. In this case, the end portions of the pair of cans 420 may be disposed to be in contact with each other.

FIG. 12 is a view illustrating another example of an arrangement relationship between the rotor core and the protruding part of the can in the rotor of the motor according to the embodiment.

Referring to FIG. 12, in a case in which a length in which the protruding length L3 of the protruding part 423 is subtracted from the length L2 of the sidewall part 422 in the shaft direction is the same as half of the length L1 of the rotor core 411 in the shaft direction, the protruding part 423 is in contact with the upper surface or the lower surface of the rotor core 411. In this case, the end portions of the pair of cans 420 may be disposed to be in contact with each other.

FIG. 13 is a view illustrating still another example of an arrangement relationship between the rotor core and the protruding part of the can in the rotor of the motor according to the embodiment.

Referring to FIG. 13, in a case in which half of the length L1 of the rotor core 411 in the shaft direction is greater than a length in which the protruding length L3 of the protruding part 423 is subtracted from the length L2 of the sidewall part 422 in the shaft direction, the rotor core 411 presses the protruding part 423. In this case, even when the protruding part 423 is disposed on the plate part 421 to protrude by as much as the protruding length L3 of the protruding part 423, the end portions of the pair of cans 420 may be disposed to be in contact with each other.

In this case, since the support part 423b of the protruding part 423 is pressed by the rotor core 411, one region at which the support part 423b meets the connecting part 423a may be in line contact with the rotor core 411.

The shaft 500 may be disposed in the housing 100 to be rotatable by the bearing 10. In addition, the shaft 500 may be rotated along with the rotor 400 in conjunction with rotation of the rotor 400.

The sensing magnet 600 may be disposed on the end portion of one side of the shaft 500. In this case, the sensing magnet 600 may be disposed to be spaced apart from the sensor 710 of the circuit board 700 by a predetermined spacing distance D.

In addition, one side of the sensing magnet 600 may be disposed to be in contact with the sealing member 800. Accordingly, when the cover 200 on which the circuit board 700 is disposed is coupled to the housing 100, since the spacing distance D between the sensor 710 and the sensing magnet 600 can be secured due to the sealing member 800, sensing performance of the motor 1 can be maintained with constant quality.

Referring to FIGS. 1 and 2, the circuit board 700 may be disposed on the cover 200. In this case, the circuit board 700 may be a printed circuit board (PCB).

In addition, the sensor 710 may be mounted on the circuit board 700. In this case, the sensor 710 may be disposed on the circuit board 700 to face the sensing magnet 600 so as to have the predetermined spacing distance D from the sensing magnet 600. In this case, the sensor 710 may be provided as a Hall integrated circuit (IC). In addition, the sensor 710 may detect changes in an N-pole and an S-pole of the sensing magnet 600 to generate a sensing signal.

Accordingly, the sensor 710 of the circuit board 700 may detect a magnetic force of the sensing magnet 600 installed to be rotatable in conjunction with the rotor 400 to allow a present position of the rotor 400 to be checked.

The sealing member 800 may be disposed on the circuit board 700 to cover the sensor 710. In this case, the sealing member 800 may be formed of a material having an elastic force.

The sealing member 800 may be applied on the sensor 710 through the hole 210 and cured. For example, in a state in which the circuit board 700 is coupled to the cover 200, the sealing member 800 may be applied on the sensor 710 through the hole 210 and cured. In addition, the cover 200 on which the circuit board 700 and the sealing member 800 are installed may be coupled to the housing 100.

In this case, an example, in which the sealing member 800 is applied on the sensor 710 and cured, is described, but the present invention is not necessarily limited thereto. For example, the sealing member 800 provided as a separate part may also be disposed to cover the sensor 710. Accordingly, since a curing time of the sealing member 800 in a coating type can be reduced due to the sealing member 800 provided as the separate part, productivity can be improved.

Meanwhile, the sealing member 800 may be disposed around the hole 210 to secure a sealing force between the housing 100 and the cover 200.

Referring to FIG. 3, the sealing member 800 may be disposed around the first region 211 of the hole 210. Accordingly, the sensing magnet 600 may be disposed to be in contact with a lower portion of the sealing member 800. In addition, the predetermined spacing distance D between the sensor 710 and the sensing magnet 600 can be maintained by the sealing member 800.

While the present invention has been described with reference to the exemplary embodiments thereof, it will be understood by those skilled in the art that various changes in form and details may be made therein without departing from the spirit and scope of the invention as defined by the appended claims.

REFERENCE NUMERALS

| | |
|---|---|
| 1: MOTOR | 100: HOUSING |
| 200: COVER | 300: STATOR |
| 310: STATOR CORE | 330: COIL |
| 400: ROTOR | 410: ROTOR UNIT |
| 411: ROTOR CORE | 412: MAGNET |
| 420: CAN | 500: SHAFT |
| 600: SENSING MAGNET | 700: CIRCUIT BOARD |
| 800: SEALING MEMBER | |

The invention claimed is:

1. A motor comprising:
a housing;
a cover disposed to cover the housing;
a stator disposed in the housing;
a rotor disposed inside the stator;
a shaft disposed in a central portion of the rotor;
a sensing magnet disposed on an end portion of the shaft; and
a circuit board including a sensor configured to detect the sensing magnet,
wherein the sensor is disposed in a hole formed in the cover, and
wherein the rotor includes:
a rotor unit including a rotor core and a plurality of magnets disposed on an outer circumferential surface of the rotor core to be spaced apart from each other; and
a pair of cans which cover an upper portion and a lower portion of the rotor unit,
wherein the cans include plate parts having a plate shape, sidewall parts protruding from outer circumferential surfaces of the plate parts in a shaft direction, and at least two protruding parts protruding from each of the plate parts, and
wherein the protruding part protrudes toward the rotor core.

2. The motor of claim 1, further comprising a sealing member disposed to cover the sensor.

3. The motor of claim 2, wherein:
the hole includes a first region and a second region which have different inner diameters;
the inner diameter of the first region is greater than the inner diameter of the second region; and
the sealing member is disposed around the first region.

4. The motor of claim 3, wherein the sealing member is applied on the sensor through the hole and cured.

5. The motor of claim 4, wherein the sensing magnet is disposed to face the sensor with the sealing member disposed between the sensing magnet and the sensor.

6. The motor of claim 5, wherein one surface of the sensing magnet is in close proximity to the sealing member.

7. The motor of claim 3, wherein the sensing magnet is disposed in the second region.

8. The motor of claim 1, wherein the protruding part is formed by cutting and pressing one region of the plate part.

9. The motor of claim 8, wherein:
the plate part includes a hole formed in a central portion thereof; and
a radius from a center (C) of the rotor to an inner circumferential surface of the plate part is smaller than a distance to the outer circumferential surface of the rotor core.

10. The motor of claim 9, wherein:
the protruding part includes a connecting part which is bent and extends from the plate part and a support part extending from the connecting part; and
the support part is in contact with one side of the rotor core.

11. The motor of claim 10, wherein as the support part is pressed by the rotor core, one region at which the support part meets the connecting part is in line contact with the rotor core.

12. The motor of claim 9, wherein the radius from the center (C) of the rotor to the inner circumferential surface of the plate part is greater than a radius of a hole formed in a central portion of the rotor core.

13. The motor of claim 1, wherein a sum of lengths of the sidewall parts of the pair of cans in the shaft direction is greater than a length of the rotor core in the shaft direction.

14. The motor of claim 1, wherein the at least two protruding parts are disposed to be rotationally symmetrical with respect to a center.

15. The motor of claim 1, wherein a thickness of the can is in a range of 3.0 to 3.5 mm.

16. The motor of claim 1, wherein:
the housing and the cover are coupled to form an accommodation space; and
one surface of the shaft in contact with the sensing magnet is disposed in the accommodation space.

17. The motor of claim 1, wherein the plate part is disposed to be spaced apart from the rotor core in the shaft direction.

18. The motor of claim 1, wherein:
the rotor core is formed by stacking a plurality of plates in the shaft direction; and
a thickness of the can is greater than a thickness of the plate.

19. The motor of claim 1, wherein end portions of the sidewall parts of the pair of cans are in contact with each other.

* * * * *